(12) United States Patent
Beresnev et al.

(10) Patent No.: US 8,503,837 B2
(45) Date of Patent: Aug. 6, 2013

(54) COMPACT FIBER OPTIC POSITIONER WITH WIDE FREQUENCY BANDWIDTH

(75) Inventors: Leonid A. Beresnev, Columbia, MD (US); Mikhail A. Vorontsov, Laurel, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 352 days.

(21) Appl. No.: 13/037,763

(22) Filed: Mar. 1, 2011

(65) Prior Publication Data

US 2012/0224824 A1 Sep. 6, 2012

(51) Int. Cl.
*G02B 6/26* (2006.01)

(52) U.S. Cl.
USPC .................................. 385/25; 385/31

(58) Field of Classification Search
USPC ........................................... 385/25
See application file for complete search history.

(56) References Cited

U.S. PATENT DOCUMENTS

| | | | | |
|---|---|---|---|---|
| 4,415,228 A | * | 11/1983 | Stanley | 385/22 |
| 6,856,712 B2 | * | 2/2005 | Fauver et al. | 385/12 |
| 7,522,813 B1 | * | 4/2009 | Johnston et al. | 385/147 |
| 7,583,872 B2 | * | 9/2009 | Seibel et al. | 385/25 |
| 7,920,312 B2 | * | 4/2011 | Rosman et al. | 359/199.1 |
| 2007/0019906 A1 | * | 1/2007 | Melville | 385/25 |

* cited by examiner

*Primary Examiner* — Hemang Sanghavi
(74) *Attorney, Agent, or Firm* — Alan I. Kalb

(57) ABSTRACT

A device for the positioning of fiber optic output including a base having a hole disposed at a midpoint thereof, a collar having an opening at a midpoint, a plurality of bimorph actuators, each actuator connected to an outer side surface of the base and located at opposite ends, a plurality of flexible beams, each having a first end connected to the collar and a second end connected to a bimorph actuator, a flexible tube inserted in the hole, where a bottom end of the tube is cantilevered at a bottom of the base and a top end of the tube is inserted in the opening of the collar, and a fiber optic embedded in the flexible tube.

23 Claims, 16 Drawing Sheets

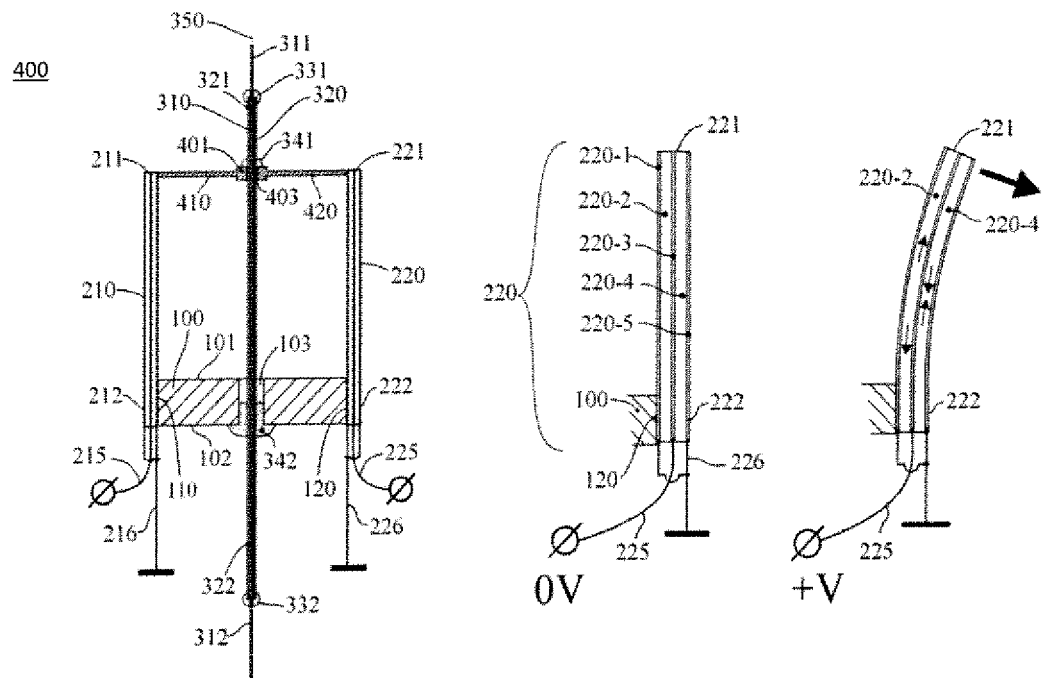
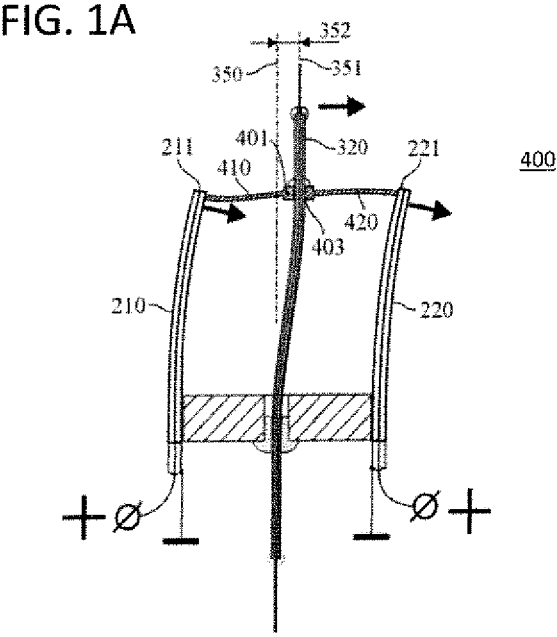
FIG. 1A
FIG. 1B
FIG. 1C
FIG. 1D

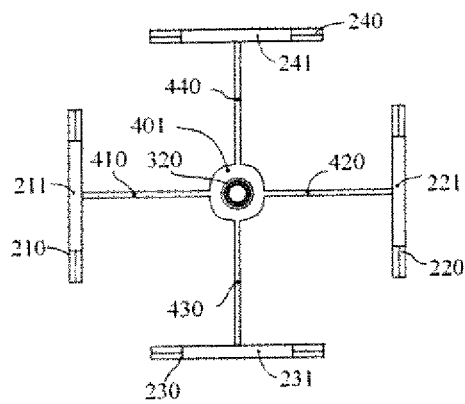
FIG. 2A
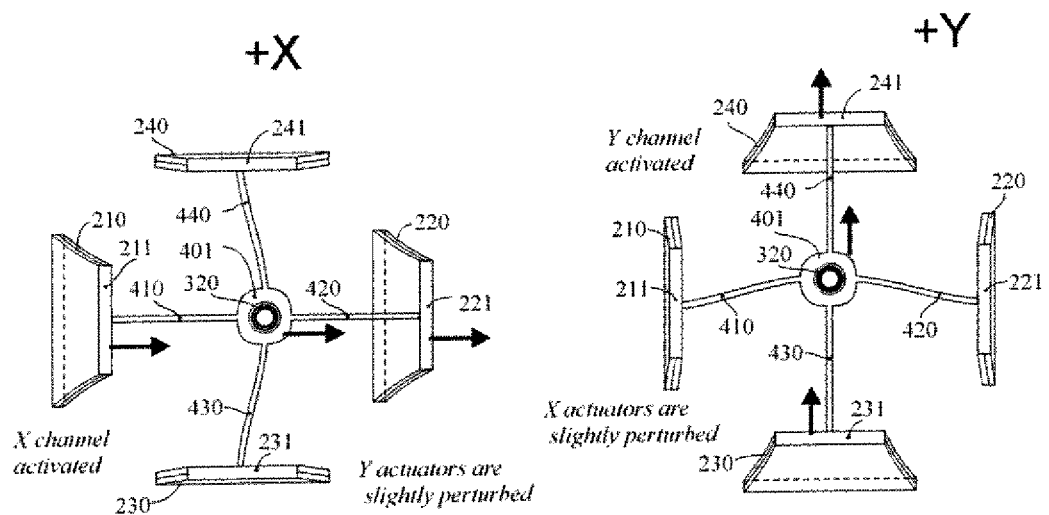
FIG. 2B
FIG. 2C

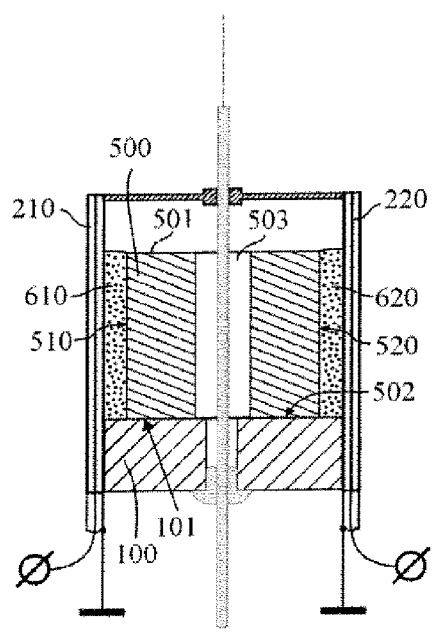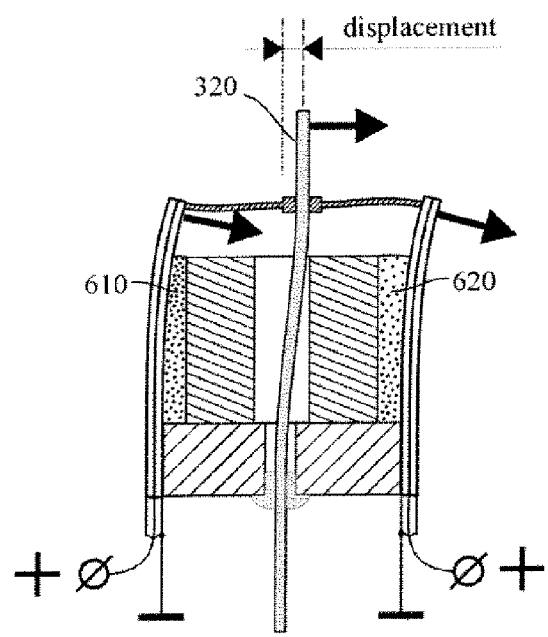
FIG. 10 A                    FIG. 10 B

FIG. 14

Table 1: Fiber optic positioner including four bimorph actuators

| | In-phase | | Out-of-phase | |
|---|---|---|---|---|
| Embodiment No | 1 | 2 | 3 | 4 |
| | X and Y are coupled | X and Y are de-coupled | X and Y are coupled | X and Y are de-coupled |
| Side view | 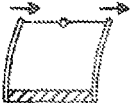 | 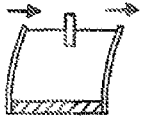 |  | 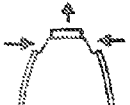 |
| Top view |  |  |  |  |
| FIG. Number | 1, 2 | 3 | 4 | 5 |

Table 2: Fiber optic positioner including two bimorph actuators

| | Orthogonal | | Parallel | |
|---|---|---|---|---|
| Embodiment No | 5 | 6 | 7 | 8 |
| Actuators arangement | X and Y are coupled | X and Y are de-coupled | X and Y are coupled | X and Y are de-coupled |
| Top view |  |  | 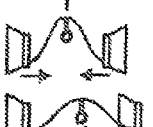 |  |
| FIG. Number | 6 | 7 | 8 | 9 |

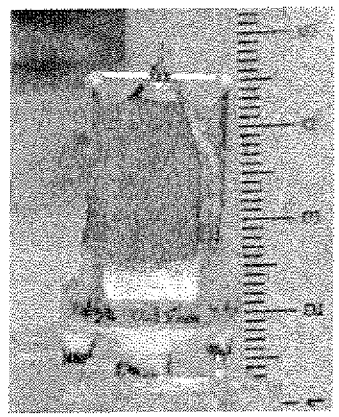 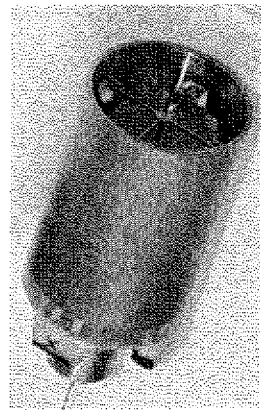
FIG. 14 A    FIG. 14 B

COMPACT FIBER OPTIC POSITIONER WITH WIDE FREQUENCY BANDWIDTH

GOVERNMENT INTEREST

The embodiments described herein may be manufactured, used, and/or licensed by or for the United States Government without the payment of royalties thereon.

BACKGROUND

1. Technical Field

The embodiments described herein generally relate to methods and devices. More particularly, the embodiments herein relate to a positioning of fiber optic devices in predetermined directions.

2. Description of the Related Art

Fiber-optic communications are well known as methods of transmitting information from one place to another by sending pulses of light through an optical fiber. The light forms an electromagnetic carrier wave that is modulated to carry information. The positioning of the optical fiber output (i.e., the source of the pulses of light) is among the most common techniques in the fields utilizing the fiber optics. The static displacement of fiber optic output having high resolution can be accomplished utilizing numerous X, Y, Z types of positioners: manual or motorized. However, it is to be noted that these positioners are very cumbersome and have various issues with regard to fiber optic displacement. For example, linear micro-motor positioners have problems moving the fiber output long distances with high speed. Additionally, modem optical communication positioners designed for near-horizontal propagation of carrier laser beams suffer from degradation of performance due to atmospheric turbulences. In particular, the degradation of the carrier beam is a result of fast fluctuating deviations of the beam from the "ideal line" connecting the laser transmitter and photo-receiver.

Several solutions have been proposed to compensate for the above-mentioned fluctuating deviations using the fast the movement of fiber optic output emitted by the transmitter and/or the movement of the distal end of the fiber optic output emitted by the receiver via placement of a remote photo-detector located adjacent to the proximal end of the fiber optic emitted by the receiver. Devices for the fast displacement of fiber optic output are used in such systems including but not limited to: micro-bar code scanners, scanning optical microscopes, flexible endoscopes, and micro-machining vision devices. All of them use the resonant amplification of the fiber distal end displacement by means of exciting the cantilevered fiber forcing the fiber to vibrate at certain resonance frequencies.

In U.S. Pat. No. 6,845,190 to Smithwick et al, the features of a standard PID (proportional integral-derivative) control is described allowing to have different resonance scanning modes.

In U.S. Pat. No. 6,515,274 to Moskovits et al, the resonance excitation of very thin and short fiber tip, aiming to obtain a high Q-factor (up to 9000) is described. The fiber diameter used ranges from about 20 to 100 mkm. The length of the fiber tip is 0.1 mm to 9 mm and the scanning distance is about 1 mkm. Further, obtaining of very thin fiber tips up to 20 mkm diameter is also described. Calculations are presented for the influence of fiber tip dimensions (length L, diameter d) on Q-factor and resonance frequency.

In U.S. Pat. No. 6,091,067 to Drobot et al., a one-dimensional fiber optic scanner is described based on the fiber optic being placed between two sheets of piezoelectric material to provide the bending bimorph structure. However, there is no data about embodiments and characteristics of the deviation amplitude of distal end of fiber as well as no data about the frequency bandwidth and resonant behavior. Moreover, the is not suitable for two-dimensional steering of the fiber optic distal end.

A two-dimensional laser beam steering device is described in U.S. Pat. No. 5,295,014 to Toda, which is based on poly-vinylidene-fluoride (PVDF) elements. The laser beam scanning is accomplished by means of mirrors connected to bimorph PVDF elements having different configurations. An electrical signal containing two frequency harmonics may induce x and y resonances at separated frequencies, thereby providing Lissajous patterns. However, it is problematic to consider this device for use in resonance-free fiber optic steering in wide frequency ranges, for instance exceeding 1 kHz, due to small stiffness of thin-film polymer-based piezoelectric material since the considerable deviations take place only at resonance conditions.

In U.S. Pat. No. 4,841,148 to Lyding, a piezoelectric tube scanner (device of Lyding) for scanning microscope is described. The tube is described as preferably being up to 6" long (hence bulky and heavy) to provide the scanning up a range of 100 mkm.

A three-dimensional scanner for a scanning probe microscope is described in U.S. Pat. No. 5,173,605 to Hayes et al. In particular, the X, Y, Z scanning tube is comprised of two telescopic tubes with quadrant arrangement of electrodes on tubes. For large displacement, four telescopic tubes can be used. Further, it is claimed that displacement up to 200 mkm is possible for a 1 inch long system and multiple electrode patterns inside and outside of cylinders. Further, it was stated that described device should have better resonance performance, than previously patented devices, however, there is no data about actual scanning ranges and resonance behavior discussed.

In U.S. Pat. No. 5,170,277 to Bard et al, a piezoelectric beam deflector for compact bar code reader is described utilizing the cantilever mounted piezoelectric bimorph elements with mirrors or masks or photodiodes at the end of bimorphs. A resonance mode is considered, yet nowhere is data presented about other experimental embodiments.

In U.S. Pat. No. 6,999,221 to Sarkisov et al., PVDF bimorph actuators driven via light are described. However, this device can not be used for high frequency bandwidth due to three basic restrictions: 1) Very small stiffness of PVDF films to provide high enough distal end displacement, so the resonance frequency could be 2-3 orders less than ceramic or crystal materials; 2) The passive damping of bending actuators require the installation of damping material, which will block the controlling light; and 3) In most fiber optic base systems, there is not enough space to introduce additional elements such as, for example LEDs, lenses, and wires.

In U.S. Pat. No. 6,748,177 to Upton, a fiber optic positioner having multiple degrees of freedom is described, using a plurality of bimorph actuators connected end-to-end and forming an open square. Patterned electrodes on each actuator allow end user to control the structure of the actuators assembly and to accomplish up to 5 degrees of freedom (e.g., X, Y, Z, tip, tilt). The positioner is assumed to be used in free-space optical communication transceivers. However, the device is slow and is considered to compensate the disturbances of the laser beam propagation direction at low-frequency vibrations of mounts, building sway, etc. Additionally, the device has unwieldy and fragile structure.

Therefore, it has been determined that there are no compact lightweight devices for two-dimensional positioning or steering fiber optics in kHz frequency bandwidth having a displacement of distances of roughly 100 microns or more.

SUMMARY

In view of the foregoing, an embodiment herein provides a device for the positioning of fiber optic output that includes a base having a hole disposed at a midpoint, a collar having an opening at a midpoint, at least two bimorph actuators where each actuator is connected to an outer side surface of the base and disposed at opposing ends, at least two flexible beams, each of the flexible beam having a first end connected to the collar and a second end connected to at least one of the bimorph actuators, a flexible tube inserted in the hole, where a bottom end of the tube is cantilevered at a bottom of the base and a top end of the tube is inserted in the opening of said collar, and a fiber optic embedded in the flexible tube.

Moreover, in such an embodiment, the device may further include a prism having first and second side surfaces and a bottom surface, the bottom surface contiguously contacting a top surface of the base and the first and second side surfaces located between each of the bimorph actuators to form gaps therebetween.

Additionally, a visco-elastic material may be embedded in the gaps.

Also, a visco-elastic material may be embedded in the hole of the base.

Moreover, each of the bimorph actuators may include at least two electro-active sheets having flat surfaces, conductive layers contiguously contacting each of the electro-active sheets, a conducting mechanism to provide an electrical signal to the conductive layers, wherein a bottom end of each of the bimorph actuators are connected to each of said side surfaces of said base and an upper end of each of said actuator moves in a first direction when a first electrical voltage is supplied to the conducting mechanism.

Further, at least one of the flexible beams may move in the first direction when the first electrical voltage is supplied to the conducting mechanism of the at least one of bimorph actuators and the flexible beams simultaneously moves in a second direction.

A top surface of the flexible tube may extends in a longitudinal direction located flush with a top surface of each of the flexible beams. The flexible tube may further be oriented perpendicular to the top surface of the base and may move in the first direction when the first electrical voltage is supplied to the conducting mechanism.

In addition, a top surface of the flexible tube may extend in a longitudinal direction, beyond a top surface of each of the flexible beams and is oriented perpendicular to the top surface of said base, and moves in the first direction when the first electrical voltage is supplied to the conducting mechanism.

A second electrical voltage may be supplied to the conducting mechanism of at least one of said bimorph actuators.

Further, each of the flexible beams and the collar may comprise any one of a metal and composite material.

Also, the electro-active sheets may comprise any one of piezoelectric crystal, piezoelectric ceramic, and electro-strictive material.

The flexible beams may be coupled to the collar using any one of screws, welding techniques, soldering techniques, glues and two-component expoxy glues.

Further, the opening of the collar may be circular having an internal diameter greater than or equal to the external diameter of the flexible tube.

Additionally, the said opening of the collar may have a rectangular-shaped cross section, the opening further having a pre-determined width and pre-determined length, whereby said pre-determined width may be equal to the external diameter the flexible tube, and the pre-determined length of the opening may forms an angle with at least one of the flexible beams.

The flexible tube may be bonded to the opening of the collar.

Moreover such an embodiment may includes a fiber optic positioner having a base having a hole disposed at a midpoint thereof, a collar having an opening at a midpoint thereof, a plurality of bimorph actuators, each actuator connected to an outer side surface of the base and disposed at opposing ends, at least two flexible beams, each of the flexible beams having a first end connected to the collar and a second end connected to at least one of the bimorph actuators, a flexible tube inserted in the hole, where a bottom end of the tube is cantilevered at a bottom of the base and a top end of the tube is inserted in the opening of the collar; and a fiber optic embedded in the flexible tube, and a prism having first and second side surfaces, a top surface, and a bottom surface, where the bottom surface contiguously contacts a top surface of the base and the first and second side surfaces are located between each of the bimorph actuators to form a gaps therebetween.

The gaps may be filled with any one of a viscous, elastic and viscous-elastic damping material to provide the damping of vibrations of said bimorph actuators at resonances.

Further, the gaps may be filled with plurality of damping materials.

The prism may further include channels formed between the top of the prism and the first and second surfaces.

The plurality of actuators may be equal to two three or four.

Further, the electrical voltages applied to said conductive mechanism of the bimorph actuators have amplitudes and polarities providing a predetermined magnitude and direction of displacement of an end of a fiber optic output.

BRIEF DESCRIPTION OF THE DRAWINGS

The embodiments herein will be better understood from the following detailed description with reference to the drawings, in which:

FIGS. 1A and 1D illustrate cross-sectional views of fiber optic positioners according to embodiments herein;

FIGS. 1B and 1C illustrate schematic diagrams of bimorph actuators of FIGS. 1A and 1D according to embodiments herein;

FIGS. 2A-2C illustrates a schematic diagram of a fiber optic positioner according to an another embodiment herein;

FIGS. 10A-10B illustrate a fiber optic positioner with passive damping of the bimorph actuator resonances according to another embodiment herein;

FIG. 14 illustrates various types of fiber optic positioners depicted in two tables in accordance with at least one embodiment herein;

DETAILED DESCRIPTION OF PREFERRED EMBODIMENTS

Figure 3A:
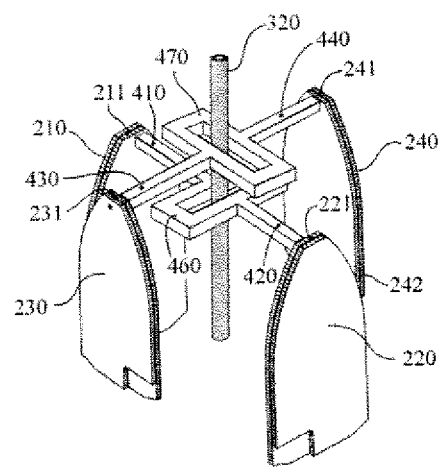
FIGS. 3A-3D illustrate cross sectional views of a fiber optic positioner according to another embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments described herein provide methods and devices that include fast two-dimensional steering or positioning of fiber optic outputs. More particularly, the embodiments described herein provide a fiber optic positioner that positions the ends of optical fiber in two dimensions by converting the light source into movement. In addition, the various embodiments described herein can be used in multiple applications including but not limited to: fiber optic collimator for fast steering the collimated laser beams such as, for instance in transceivers of free-space optical telecommunication systems with high-speed compensation of tip/tilt disturbances of laser beam propagating through turbulent atmosphere or multi-beam laser systems for providing the synchronous uni-directional propagation of a plurality of laser beams, aiming to improve the optical communication link performance or to increase the power of laser light delivered to the destination photo-detector or target.

Referring now to the drawings, and more particularly to FIGS. 1 through 15, where similar reference characters denote corresponding features consistently throughout the figures, there are shown preferred embodiments.

As will be appreciated by one skilled in the art, the embodiments described herein may be embodied as a method, a testing process or apparatus, for fast two-dimensional positioning and/or steering of fiber optic outputs.

According to the embodiments described herein and in further detail below with reference to FIGS. 1-15, the fiber optic positioning device generally has four basic parts that are consistent in each embodiment described below that, among other things, monitors the controlled displacement of a fiber optic cable: 1) a multi-functional base, 2) a plurality of bimorph actuators, capable to bend due to a prescribed supplied electric voltage, 3) flexible beams that generally translate the bending of the actuators into the X-Y displacements of the upper end of a flexible tube with a fiber optic cable installed therein and 4) a collar with an opening having a variable profile converting the simple deviation of distal ends of bimorph actuators into pre-determined direction of fiber tip displacement.

Further, the fiber optic positioner of the present invention can be classified into two main functional, which are represented in Tables 1 and 2 shown in FIG. 14: a group including two bimorph actuators and a group including four bimorph actuators. Further, each group is dissected into sub-groups representing in phase and out of phase versions, as well as coupled and de-coupled versions. It is to be appreciated, however, that the examples and groupings of the embodiments discussed below are merely examples and as such, the present invention is not limited thereto. For instance, three or more bimorph actuators may be considered.

Table 1 as shown in FIG. 14 represents simplified drawings of embodiments of the fiber optic positioner including four bimorph actuators, which are further explained in detail with reference to the figures below.

Table 2 also shown in FIG. 14 represents simplified drawings of four embodiments of the fiber positioner including two bimorph actuators, which are further explained in detail with reference to the figures below.

FIG. 1A shows an embodiment of the fiber optic positioner 400 of the present invention. Referring to FIG. 1A, fiber optic positioner 400 includes a base 100 that includes a hole 103, top and bottom surfaces 101, 102 and side surfaces 110, 120 perpendicular to the top and bottom surfaces 101, 102 being disposed at opposing ends thereof. Further, a plurality of piezoelectric bimorph actuators 220, 210 are affixed to side surfaces 110, 120 of the base 100 The bottom ends 212, 222 of actuator 220, 210 are fixed to the side surfaces 110, 120 of the base 100 and top ends 211, 221 of actuators 220, 210 are moveable and bend according to an applied electric voltage, which will be described with reference to FIGS. 1B and 1C in further detail below.

Referring to FIG. 1B, a typical bimorph actuator according to another embodiment of the present invention is shown. Actuator 221, includes two malleable electro-active plates 220-2, 220-4 that expand or contract according to an applied electric voltage, which will be described in further detail below. It is to be appreciated that plates 220-2, 220-4 may be manufactured utilizing any stringently selected material of specially piezoelectric constant d31, which is well known to those having ordinary skill in the art including but not limited to: piezoelectric ceramic, single crystal piezoelectric or any electro-strictive materials. Conductive films 220-1, 220-3 and 220-5 are bonded to plates 220-2, 220-4 and supply a voltage to plates 220-2-220-4 via an external voltage source (not shown) that is supplied to electrical wires 225, 226. It is to be appreciated that an appropriate choice of parameters (i.e., polarity, phase, and amplitude) of the electrical voltage may be applied depending upon end user specifications. Further, it is to be noted that plates 220-2 and 220-4 may be fixed or bonded via any suitable adhesive known to those having ordinary skill in the art, such as, for example, epoxy glues or ultra-violet resins. However, the above cited adhesives are merely cited as examples and, as such, the present invention is not limited thereto.

Referring to FIG. 1C, the deformation or bending of bimorph actuator 220 initiated by a supplied voltage is shown. Generally, the lower portion 222 of actuator 220 is coupled to the side surface 120 of the base 100 via any well known coupling means known in the art. Such examples may include but are not limited to screws, soldering techniques, welding techniques, glues, or epoxy glue resins. An external voltage is then supplied to wires 225 and 226, which accordingly causes plate 220-2 to expand or elongate and plate 220-4 to contract, if the directions of the electric polarization are perpendicular to the surfaces of actuator 220 (i.e., in d31 piezoelectric mode). Consequently, actuator 220 bends in an outward direction.

Flexible tube 320 includes upper and lower ends 321,322 whereby upper end 321 is inserted into collar 401 and the lower end is inserted into hole 103 of the base 100. Further, flexible tube 320 extends in a longitudinal direction and is oriented perpendicular to the top surface 101 of the base 100. Additionally, tube 320 is bonded with base 100 via a soft adhesive 342. It is appreciated that "soft adhesive" is defined herein to mean any known adhesive suitable adhesive known in the art including but not limited to glues or ultra-violet cured compositions.

Fiber optic 310 includes top and bottom ends 311,312 and is further disposed inside flexible tube 320. The bottom end 312 of the fiber optic 310 is bonded to the bottom end of the tube 322 via soft adhesive 332. Upper end 311 of the fiber optic 310 extends in a longitudinal direction and may rest flush with the upper end 321 of flexible tube 320 or may further extend beyond a top surface of upper end 321 of the tube 320 and can further be bonded or coupled by soft adhesive 331. The end 311 can be as well inside of the tube or evenly arranged with the top 321 of the tube 320.

The flexible tube 320 is malleable and bends in a predetermined distance and direction providing the displacement of the upper end 311 of the fiber optic 310 together with tube 320 which will be described in further detail below with reference to FIG. 1D. It is appreciated that the direction of tube bending is determined by the shape of the opening in collar 401.

FIG. 1D shows another embodiment of the fiber optic positioner 400 of the present invention. Referring to FIG. 1D, the bending of the tube 320 in a predetermined direction is shown. In particular, flexible beams 410, 420 translate the bending of bimorph actuators 210, 220 into movement of the upper end 321 of the tube 320 and ultimately the fiber optic 310. For example, when a positive voltage is supplied to actuators 210, 220 via wires 225, 226, the upper ends 211,221 of the actuators 210,220 bend in a predetermined direction a predetermined distance. As actuators 210, 220 bend, flexible beam 410, which is coupled with actuator 211, provides a pushing force upon collar 401. Further, flexible beam 420, which is coupled to actuator 221 exerts a pulling force upon collar 401 thereby resulting in the displacement of the collar 401 to the right, The upper end 321 of the flexible tube 320 is inserted into opening 403 formed in collar 410, thus, as a result of the bending of actuators 210, 220, as well as the movement of flexible tube 320, the distal end 311 of the fiber optic 310 bends in the direction of the actuators 211,221 by a distance 352.

FIGS. 2A-2C show the fiber optic positioner according to another embodiment utilizing four bimorph actuators 210, 220, 230, 240. Referring to FIG. 2A, four flexible beams 410, 420, 430, 440 connect and form a cross-like pattern. Further, beams 410, 420, 430, 440 connect the top ends 211, 221, 231, 241 of actuators 210, 220, 230, 240 with collar 401.

In FIGS. 2A-2C, the base (not numbered) has four side surfaces and further has a square-shaped cross section. Bottom ends 212, 222, 232, 242 of the bimorph actuators 210, 220, 230, 240 are connected to respective surfaces of the base preferably by means of hard adhesive, as it is shown for selected actuators 210 and 220 in FIGS. 1A and 1B. Note that "hard adhesive" is defined herein to include but is not limited to glues or more particularly two component epoxy glues.

Referring to FIG. 2B, the X displacement of the collar 401 and flexible tube 320 is shown. As illustrated in FIG. 2B, collar 401 is displaced by a predetermined distance and direction along with flexible tube 320 which is inserted therewith, is defined herein to be the X-displacement. When, a positive voltage signal is applied to actuators 210, 220, top ends 211, 221 of the actuators 210, 220 move a predetermined distance to the right. The predetermined distance is approximately equal to distance 352 shown in FIG. 1D. Flexible beam 410 applies a pushing force to collar 401 and simultaneously if the external voltage is applied to both actuators 210 and 220, beam 420 exerts a pulling force on collar 401 providing the positive X displacement of the upper end (not numbered) of the flexible tube 320. It is to be appreciated The displacement of collar 401 induces slight parasitic bending of beams 430, 440 and consequently, causes a parasitic displacement of the top ends 231, 241 of actuators 230,240 toward each other. However, this parasitic perturbance is negligent and measures to roughly in the order of (0.1-0.3 mkm) ten one-hundredths of microns whereby the length of flexible beams 430, 440 measure to be about 10 mm in length. It is to be appreciated that the above measurements and distances are merely examples, and as such, the embodiment herein is not limited thereto. Moreover, it was determined that the parasitic bending of top ends 231, 241 of actuators 230,240 and further flexible beams 430,440 does not interfere with the corresponding Y displacements of actuators 230, 240 to thwart the overall symmetry of the fiber optic positioner.

FIG. 2C shows Y-displacement of the collar 401 and flexible tube 320. It is to be noted that displacement can happen either simultaneously or sequentially with X-displacement without negligent mutual interference. As illustrated, collar 401 and tube 320 are displaced or bent in an upward direction, which is referred to herein as the Y-displacement. Similarly, as with the X-displacement described above, a positive voltage signal is supplied to actuators 230, 240 and upper portions 231, 241 of the actuators 2330, 240 move upwards. Flexible beam 430 supplies a pushing force to collar 401 and simultaneously, beam 440 exerts a pulling force on the collar 401 providing the positive Y-displacement of the upper end of the tube 320. The Y-displacement of collar 401 induces slight parasitic bending of beams 410, 420 as well as a slight parasitic displacement of the upper portions 211, 221 toward each other in the order of (0.1-0.3 mkm) ten one-hundredths of a micron. The parasitic perturbance is negligent and does not interfere with the X-displacement to thwart the overall symmetry of the fiber optic positioner.

Figure 3B:
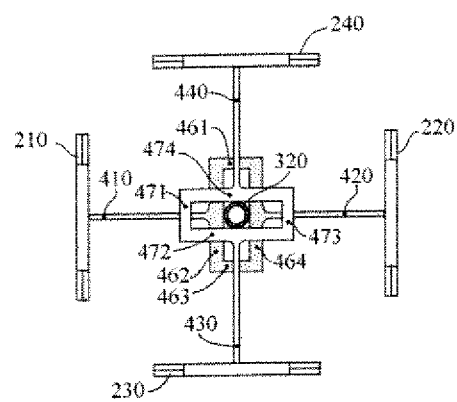

FIGS. 3A-3D show the fiber optic positioner according to another embodiment of the present invention utilizing four bimorph actuators 210, 220, 230, 240 adhered to a base (not shown) having a square shaped cross section. In FIGS. 3A-3D the fiber optic positioned is shown with two separate flexible beam fork collars: a lower flexible beam fork collar 460 and an upper flexible beam fork collar 470, which are used for translating the bending of respective actuators 210, 220, 230, 240 into the respective X-Y displacements of flexible tube 320. Turning to FIG. 3B, lower flexible beam fork 460 collar consists of a frame comprised of sides 461, 462, 463, 464 and flexible beams 410, 420 attached to the frame being further coupled to actuators 210,220 respectively. The sides 461-464 combine together to have a rectangular-shaped cross section.

Further, sides 462 and 464 form an opening having width which is equivalent to or greater than the diameter of flexible tube 320 for insertion therewith, and thus the tube can slide along with the longer axis of the opening without backlash. The longer axis of the opening is perpendicular to flexible beams 410 and 420. Moreover, outer ends of beams 410, 420 of the lower fork collar 460 are connected to the upper portions 211,221 bimorph actuators 210 and 220 thereby controlling the X-displacement of the flexible tube 320. Upper flexible beam fork collar 470 consists of the frame that includes sides 471, 472, 473 and 474 and beams 430,440 attached to the frame being further coupled to actuators 230, 240. The sides 471-474 further combine together to have a rectangular-shaped cross section. Additionally, sides 472 and 474 form an opening having a slot-like width equivalent to or greater than that of the diameter of tube 320. The tube 320 can slide along the width of the longer axis without backlash. The longer axis of the opening is perpendicular to beams 430 and 440. Additionally, outer ends of the beams 430, 440 of the upper flexible beam fork collar 470 are connected to the upper portions 231,241 of actuators 230 and 240, thereby controlling the Y-displacement of the tube 320. Moreover, it is to be noted that the longer axes of flexible beam forks collars 460 and 470 are mutually orthogonal.

Figure 3C:
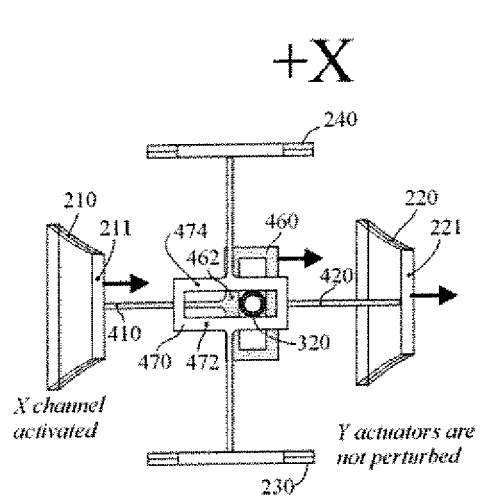

FIG. 3C shows the controlled X-displacement of the tube 320, when a positive voltage signal is supplied to actuators 210 and 220, respectively. Upper portions 211,221 of the actuators 210,220 bend in a predetermined direction (e.g., to the right). In particular, upper portion 211 applies a pushing force to beam 410 in a predetermined direction and distance as dictated by actuator 210, and upper portion 221 exerts a pulling force on beam 420 by actuator 220 in the same direction. This simultaneous push-pull action accordingly causes the lower fork frame collar 460 to also move in the direction dictated by the push-pull force. Consequently, side 462 of the fork frame collar 460 pushes the tube 320 in the same push-pull direction. The displacement of the tube in the push-pull direction takes place along the opening of upper flexible beam fork collar 470 formed with sides 472,474. Preferably, the diameter of the tube 320 is selected such that it is able to slide along the opening without interfering with the upper fork frame collar 470, and thus, the actuators 230,240 which are coupled to beams 430,440 for controlling the X-displacement are not disturbed.

Figure 3D:
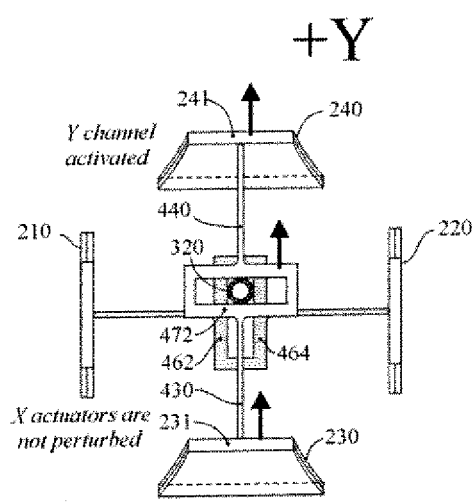

FIG. 3D shows the controlled Y-displacement of the tube 320, when a positive voltage signal is supplied to actuators 230 and 240, respectively. Upper portions, 231,241 of these actuators bend in a predetermined direction (e.g., upward) and upper portion 231 applies a pushing force on beam 440 in the same direction as actuators 230. The upper portion 241 exerts a pulling force on beam 420 in the same direction. Consequently, side 472 of the upper fork frame collar 470 pushes the tube 320 in the push-pull direction. The displacement of the tube in the push-pull direction takes place along the slot of lower fork frame collar 460 formed with sides 462 and 464. Preferably, the diameter of the flexible tube 320 is selected such that it slides freely along the opening without backlash and interfering with the lower fork frame collar 460 and leaving actuators 210,220 responsible for controlling the X-displacement of flexible tube 320 undisturbed. It is to be appreciated that the fiber optic positioner described above enables and end user to significantly increase the sensitivity of the deviation of the upper end of the fiber optic.

Figure 4A:
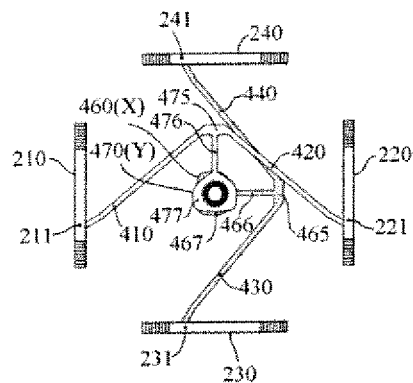
FIGS. 4A-4C illustrate cross sectional views of a fiber optic positioner with out-of-phase operation of bimorph actuators with small coupling according to another embodiment herein.
Figure 4B:
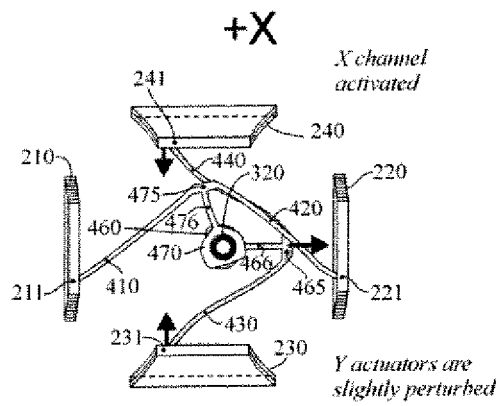
Figure 4C:
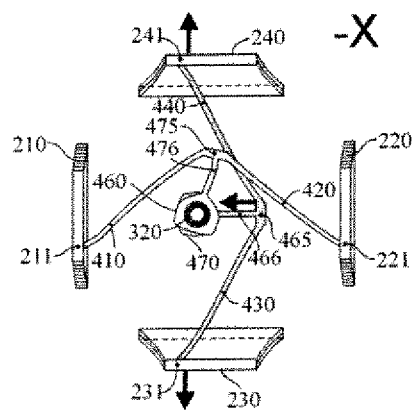

FIGS. 4A-4C show the fiber optic positioner according to another embodiment herein utilizing four bimorph actuators 210,220, 230,240 adhered to a base (not shown) having a square-shaped cross section.

Referring to FIG. 4A, two separate flexible beam forks: a lower fork 467 and an upper fork 477, composed each from 3 respective flexible beams 430,440,466 and 410,420,476 and collar 467,477 are used for translating respective actuator 210,220, 230, 240 movements into the X and Y-displacements of the flexible tube 320. Referring to FIG. 4B, the lower fork 467 consists of collar 460 and has an overall the V ("chevron")-shape cross section. Lower fork 467 is further comprised of beams 430 and 440 which are connected with bridge 465. The outer ends of beams 430, 440 are attached to the upper portions 231, 241 of actuators 230, 240 thereby controlling the X-displacements of flexible tube 310. A central beam 466 connects the collar 460 via a bridge 465. The upper fork 477 (see FIG. 4A) consists of collar 470 and beams 410, 420 connected via bridge 475 having an overall V (i.e., "chevron")-shaped cross section. The outer ends of beams 410, 420 are attached to the upper portions 211, 221 of actuators 210 and 220 thereby controlling the Y-displacement of flexible tube 320. Additionally, central beam 476 connects the collar 470 with bridge 475.

Referring to FIG. 4B, the displacement of the tube 320 to the right (e.g., the +X direction) is accomplished by the application of a positive voltage being supplied to the actuator 230 and a negative voltage to actuator 240. Further, the upper portions 231,241 of the actuators 230,240 move toward each other and an angle $\Theta_1$ (not shown) formed between beams 430, 440 decreases, thereby inducing the movement of bridge 465 to the right. The bridge 465 then exerts a pulling force on central beam 466 and collar 460 to the right. Additionally, the flexible tube 320, which is installed in openings formed in collars 460 and 470, moves to the right. There is a small parasitic deformation of the beams 476, 410 and 420 of the upper fork 477 (FIG. 4A). However, depending upon the specified dimensions and thickness of the beams, the interference between X and Y channels is negligible.

Referring to FIG. 4C, the displacement of the tube 320 to the left (i.e., the −X direction) is shown. In FIG. 4C, a negative voltage signal is supplied to the actuator 230 and a positive voltage signal is supplied to the actuator 240. Upper portions 231,241 of actuators 230,240 move outwardly, thereby increasing angle $\Theta_2$ (not shown) between beams 430 and 440. The bridge 465 moves to the left and, as a result, pushes flexible beam 466 and fork collar 470 to the left. Additionally, the flexible tube 320, which is installed in collars 460 and 470, moves to the left. Moreover, there is the small parasitic deformation of the beams 476, 410 and 420 of the upper fork 477 (numbered in FIG. 4A). However, depending upon the specified dimensions and thickness of the beams, the interference between X and Y channels is negligible. The Y-displacements are controlled via application of the external negative and positive voltage signals to the actuators 210 and 220 in the same manner as for X-displacements, yet instead, resulting in movement of the collar 460 in up and down longitudinal directions.

Figure 5A:
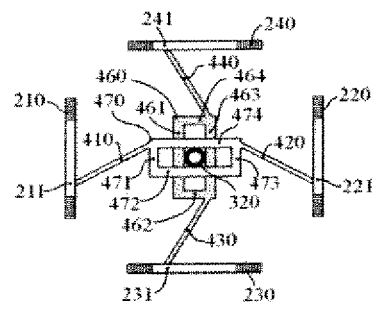
FIG. 5A-5C illustrate the fiber optic positioner of FIGS. 4A-4C with no coupling according to another embodiment herein.
Figure 5B:
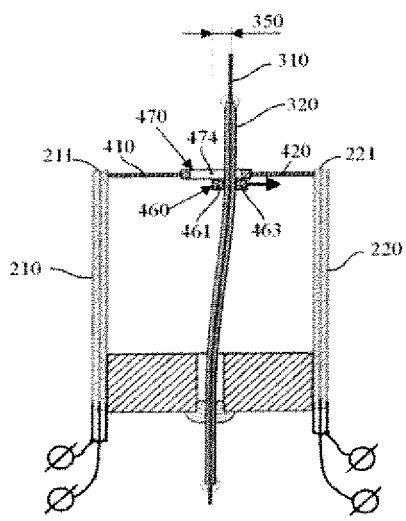
Figure 5C:
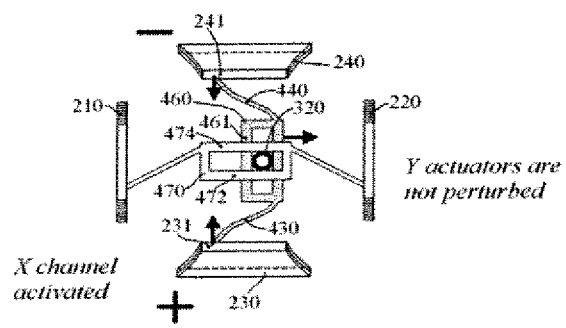

Referring to FIGS. 5A-5C, the fiber optic positioner according to another embodiment of the present invention is shown utilizing four bimorph actuators 210,220, 230, 240 adhered to a base having square-shaped cross section.

In FIG. 5A, a cross-sectional top view of the fiber optic positioner is shown wherein no voltage is supplied to actuators 210,220,230,240. Similarly, FIGS. 5B-5C show cross-sectional side views the fiber optic positioner displaying a non-perturbed Y-channel when the X-displacement is activated via actuators 430, 440 (not shown on this cross-section). Additionally, two separate fork frame collars: lower fork frame collar 460 and upper fork frame collar 470, are responsible for translating the bending movement of actuators 430,440 into the displacements of flexible tube 320.

Lower fork frame collar 460 consists of a frame comprised of sides 461, 462, 463 and 464 and two flexible beams 430, 440 attached therewith. Further, sides 461 and 463 form an opening that has width equal to the diameter of the tube 320. The longer axes of the opening are perpendicular to the surfaces of actuators 230, 240 and outer ends of flexible beams 430, 440 of the lower fork frame collar 460 are connected to the upper portions 231,241 of the bimorph actuators 230,240 which accordingly, control the X-displacement of flexible tube 320. Flexible beams 430, 440 are separated by an angle $\Theta_1$, (not shown) measuring about 90 degrees therewith.

Upper fork frame collar 470 consists of a frame comprised of sides 471, 472, 473, 474 and flexible beams 410,420 attached therewith. Sides 472, 474 form an opening having slot-like gap with a width equal to the diameter of flexible tube 320. The longer axes of the opening are perpendicular to the internal surfaces of actuators 210,220 and the outer ends of the flexible beams 410, 420 are attached to the upper portions 211, 221 of actuators 210,220 which accordingly, control the Y-displacements of flexible tube 320. Flexible beams 410,420 are separated by an angle $\Theta_2$ (not shown) measuring about 90 degrees therewith. It is to be appreciated that the longer axes of the openings in fork frame collars 460 and 470 are mutually orthogonal.

Turning to FIGS. 5B-5C, the controlled X-displacement of the flexible tube 320 to the right is shown. Specifically, a positive voltage signal is supplied to actuator 230 and a negative voltage signal is applied to actuator 240. As a result of the respective voltages, the upper portions 231, 241 of the actuators 230, 240 move toward each other. Additionally, flexible beams 430, 440 deform in such a manner that the angle $\Theta_1$ (not shown) between beams 430 and 440 decreases and the bottom fork frame collar 460 moves to the right. The side 461 of the fork frame collar 460 then pushes the flexible tube 320 to the right (i.e., in the +X displacement) along with a distal end of a fiber optic embedded inside of the flexible tube 320.

The change in polarity of voltages supplied to the actuators 230,240 induces the movement of the upper portions 231,241 of actuators 230,240 away from each other, resulting in increase of the angle $\Theta_1$ (not shown) between flexible beams 430,440. The upper fork frame 460 moves to the left (i.e., the −X direction) together with the tube 320, providing the −X displacement of the distal end of the fiber optic embedded inside flexible tube 320.

Right and left displacements of flexible tube 320 take place along the opening of upper fork frame 470. Preferably, the diameter of the flexible tube 320 is selected such that it slides freely without interfering with the upper fork frame collar 470 and leaving the actuators 210,220 responsible for controlling the Y-displacement of flexible tube 320 undisturbed.

The initiation of the Y-displacement of flexible tube 320 is controlled via actuators 210,220. In particular, +Y displacement takes place if a positive voltage is supplied to actuator 210 and a negative voltage is supplied to actuator 220. The upper portion 211, 221 of actuators 210,220 bend and move toward each other thereby decreasing the angle $\Theta_1$ (not shown), formed between flexible beams 410,420 and urging the upward (i.e., +Y) movement of the upper fork frame 470 along with flexible tube 320. The −Y displacement takes place if a negative voltage is supplied to actuator 210 and a positive voltage is supplied to the actuator 220. The upper portions 211, 221 of actuators 210, 220 bend and move away from each other and angle $\Theta_1$ (not shown) between flexible beams 410,420 increases thereby inducing the downward (−Y) motion of the upper fork frame 470 together with the flexible tube 320.

It is to be appreciated that the above embodiments shown in FIGS. 3-4 have the mutual compensation of momentums of inertia inherent in bimorph actuators. This compensation takes place due to the bending movement of the actuators in the X and Y directions, thereby allowing the avoidance of vibrations of the fiber optic positioner relative to the supporting structure.

FIGS. 6A-6D show the fiber optic positioner according to embodiments herein utilizing two actuators. It should be appreciated that with regard to the two-actuator embodiment of the fiber optic positioner, the voltage signal should be supplied to both actuators to provide precise X and/or Y displacements due to strong coupling of both channels.

Figure 6A:
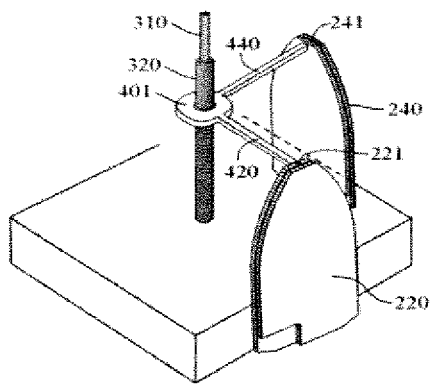
FIGS. 6A-6C illustrate cross sectional views of the fiber optic positioner with internal surfaces of bimorph actuators perpendicular to each other with some coupling according to another embodiment herein.

Turning to FIG. 6A, the fiber optic positioner according to another embodiment herein utilizing a two actuators is shown. Lower portions of actuators 220 and 240 are attached to the side surfaces of the base (not numbered). The surfaces are perpendicular to each other, providing the perpendicular alignment of the internal surfaces of actuators 220. 240. A flexible tube 320 containing a fiber optic 310 is cantilevered on the bottom of the base as shown in FIG. 1A. The upper end of the flexible tube 320 is inserted into a collar 401, which is connected to actuators 220,240 via flexible beams 420,440.

Figure 6B:
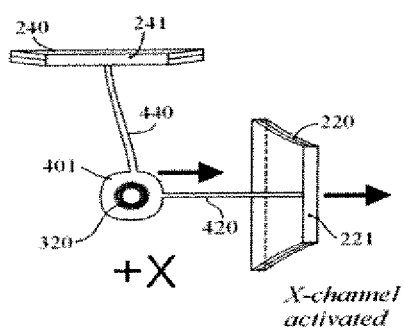

In FIG. 6B, the +X displacement of flexible tube 320 is shown. A positive voltage signal is applied to actuator 220 and as a result, the upper portion 221 of actuator 220 bends or moves to the right and consequently moves flexible beam 420 therewith, ultimately pulling the tube 320 along with fiber optic 310.

Figure 6C:
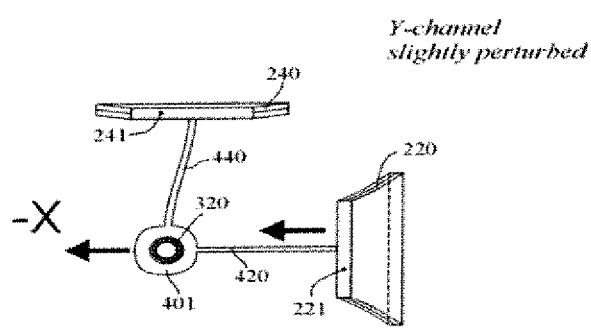

In FIG. 6C the −X displacement of flexible tube 320 is shown. A negative voltage signal is applied to actuator 220 and as a result, the upper portion 221 of actuator 220 bends or moves to the left and consequently moves flexible beam 420 therewith, ultimately pushing the tube 320 along with fiber optic 310. It is to be appreciated that there may exist a parasitic deformation of flexible beam 420, which can be compensated for by applying a very small negative voltage signal to the actuator 240.

Similarly, the +Y and −Y displacement can be obtained by applying positive and/or negative voltages to the actuator 240, thereby providing the pull or push action to the flexible beam 440 and correspondingly to the tube 320 as discussed above with reference to FIGS. 6B-6C.

Figure 7A:
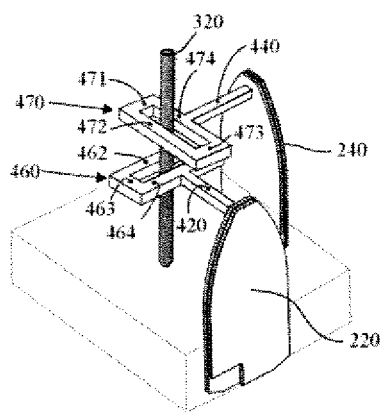
FIG. 7A-7C illustrate cross sectional views of the fiber optic positioner of FIGS. 6A-6C with no coupling according to another embodiment herein.
Figure 7B:
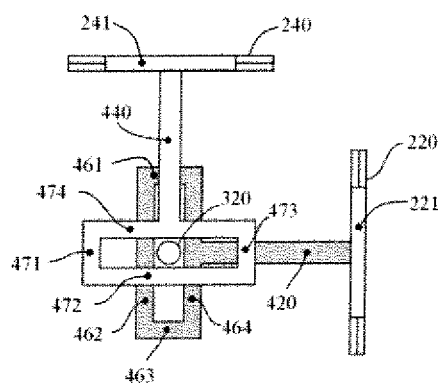
Figure 7C:
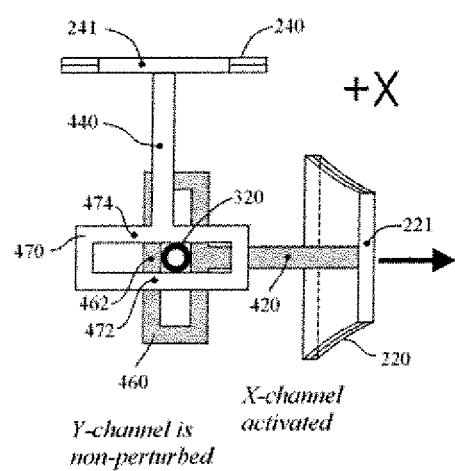

In FIGS. 7A-7C show another embodiment of the fiber optic positioner utilizing two bimorph actuators and further having two separate flexible beam fork collars: a lower flexible beam fork collar 460 and an upper fork collar 470, which are used for translating the movement of the actuators 220, 240 into displacement of the flexible tube 320. Referring to FIG. 7A, lower flexible beam fork collar 460 consists of a frame comprised of sides 461, 462, 463, 464 and beam 420 attached to the frame at an upper portion 221 of actuator 220. Upper flexible beam fork collar 470 consists of a frame comprised of sides 471, 472, 473, 474 and beam 440 attached to the frame at an upper portion 241 of the actuator 240.

In FIG. 7C, the +X displacement of flexible tube 320 is shown. When a positive voltage signal is supplied to actuator 220, the upper portion 221 of the actuator 220 moves or bends to the right and correspondingly pulls the flexible beam 420 along with lower flexible beam fork collar 460 in the same direction. Further, side 462 of the frame pushes the flexible tube 320 to the right, thereby providing the +X displacement of a fiber optic embedded in flexible tube 320.

The −X displacement can be achieved by applying a negative voltage signal to the actuator 220. The upper portion 221 of the actuator 220 will move or bend to the left and will correspondingly push flexible beam 420 and lower fork frame collar 460 to the left. Further, side 464 (FIG. 7B) will push the tube 320 to the left thereby providing the −X displacement of the fiber optic installed in flexible tube 320. The area of the flexible beam fork collar is equal to the diameter of flexible tube 320. Thus, with the +X and −X displacements of flexible tube 320, flexible tube 320 slides along the opening of upper flexible fork frame 470 along sides 472 and 474. It is to be noted that there is no coupling between actuators 220 and 240 if pure X or Y displacements are induced.

The +Y and −Y displacements of flexible tube 320 can be achieved by supplying a positive and/or negative voltages to the actuator 240 in the same manner as discussed above with the +X and −X displacements. Corresponding movement of the upper portions 241 of the actuator in up and/or down directions, pulls and/or pushes flexible beam 440 and upper flexible fork frame 470 in an up or down direction, thereby providing the +Y or −Y displacements of the tube 320. Both +Y and −Y movement of the tube 320 take place along the opening of lower flexible fork frame 460 along sides 462 and 464.

Figure 8A:
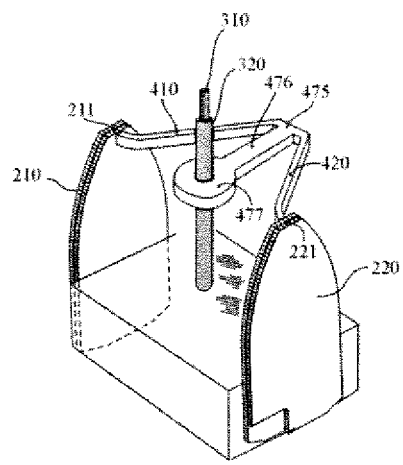
FIGS. 8A-8C illustrate cross sectional views of a fiber optic views of the fiber optic positioner with internal surfaces of bimorph actuators parallel to each other and some coupling according to another embodiment herein.
Figure 8B:
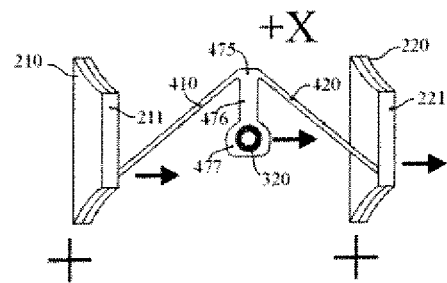
Figure 8C:
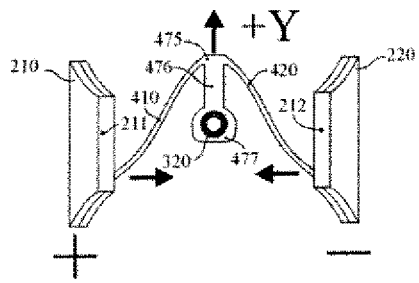

In FIGS. 8A-8C, the fiber optic positioned is shown utilizing two-actuators 210, 220 in a the parallel arrangement. In FIG. 8A, a base (not numbered) has two parallel side surfaces whereby bottom ends of actuators 210, 220 are attached thereto via a hard adhesive. A bottom end of a flexible tube 320 is cantilevered near the bottom surface of the base and the upper portion of the flexible tube 320 is installed in a collar 477. Collar 477 is coupled to a flexible beam 476 that is connected to flexible beams 410, 420, 476 via a bridge 475. Flexible beams 410 and 420 are coupled to the upper portions 211,221 of the actuators 210, 220 with hard adhesive and separated by an angle Θ (not shown) which about 90 degrees.

In FIG. 8B, the +X displacement of flexible tube 320 with a fiber optic installed therein. When positive voltages are supplied to the actuators 210,220, the upper portions 211 and 221 of the actuators 210, 220 move to the right. Upper portion 211 then pushes flexible beam 410 and simultaneously upper portion 221 pulls the beam 420. The simultaneous motion of flexible beams 410, 420 to the right induces the motion of the bridge 475 and beam flexible beam 476 to the right providing the +X displacement of the flexible tube 320. Similarly, the −X displacement of the tube 320 (in the opposite direction) can be achieved by supplying a negative voltage signal actuators 210,220. Upper portions 211,221 of actuators 210, 220 move to the left. Consequently, upper portion 211 pulls flexible beam 410 and upper portion 221 pushes flexible beam 420 to the left. The simultaneous motion of flexible beams 410,420 to the left incites the motion of the bridge 475 and flexible beam 476 to the left, thereby providing the −X displacement of collar 477 with flexible tube 320 and fiber optic installed therein.

FIG. 8C shows +Y displacement of flexible tube 320. When a positive voltage signal is supplied to actuator 210 and negative voltage signal is supplied actuator 220, the upper portions 211, 221 of the actuators 210, 220 move toward each other. Consequently, an angle Θ formed between flexible beams 410, 420 decreases, thereby causing the bridge 475 to move in an upward direction. As bridge 475 moves upward, it pulls flexible beam 476 and collar 477 upwards, thus providing the +Y displacement of the flexible tube 320 with a fiber optic installed therein.

To obtain the −Y displacement a negative voltage is supplied to the actuator 210 and a positive voltage is supplied to the actuator 220. Upper portions 211,212 of the actuators 220 move away from each other and Θ decreases increases, resulting in motion of the bridge 475 downward. The bridge 465 then pushes the beam 476 and the collar 477 downward providing the −Y displacement of the tube 320.

Figure 9A:
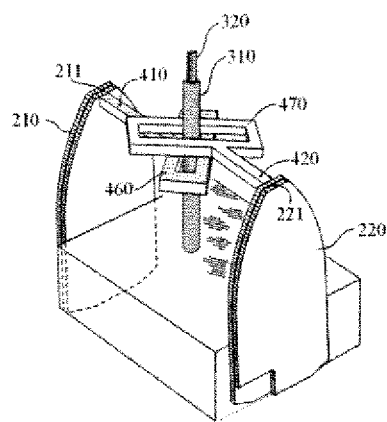
FIGS. 9A-9D illustrate cross sectional views of the fiber optic positioned of FIGS. 8A-8C with no coupling according to another embodiment herein.

In FIGS. 9A-9D, the fiber optic positioner according to another embodiment herein utilizing two bimorph actuators is shown. Referring to FIG. 9A, actuators 210, 200 are arranged in parallel agreement and a base includes two parallel side surfaces with bottom ends of the actuators 210, 220 being attached thereto via a hard adhesive. A bottom end of a flexible tube 320 is cantilevered near the bottom surface of the base and an upper end of the tube 320 is inserted into a lower fork frame collar 460 as well as an upper fork frame collar 470 which are both coupled to flexible beams 410 and 420 respectively.

Figure 9B:
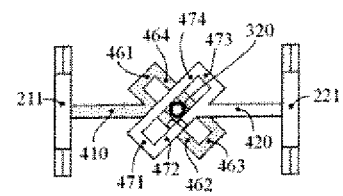

In FIG. 9B, the constitution of upper and lower fork frame collars 460,470 is shown. The lower fork frame collar 460 is comprised of sides 461, 462, 463, 464. Sides 462 and 464 are parallel to each other and form an opening having an area equal to the diameter of the flexible tube 320. The lower fork frame collar 460 is connected to upper portion 211 of the actuator 210 via flexible beam 410. The longer axis of the opening of the lower fork frame collar form an angle (now shown) with the beam 410 having a measurement of approximately 135.°

The upper fork frame collar 470 consists of sides 471, 472, 473, 474. Sides 472 and 474 are parallel to each other and form an opening, whereby the width or area of the opening is equal to the diameter of the tube 320. Upper flexible fork frame 470 is connected to actuator 220 via flexible beam 420. Further, the longer axis of the opening forms an angle (not shown) with the beam 420 having a measurement of roughly 45°.

Figure 9C:
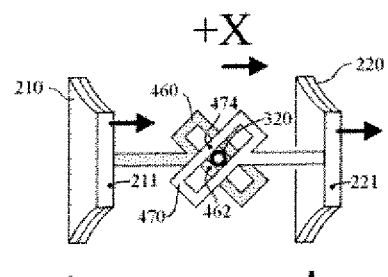

In FIG. 9C, the +X displacement of the flexible tube 320 is shown. When positive voltage signals voltages supplied to actuators 210, 220, upper portions 211,221 of the actuators 210, 220 move or bend to the right. Upper and lower flexible fork frames 460 and 470 move to the right. The simultaneous movement of sides 462 of the lower fork frame 460 and of side 474 of the upper fork frame 470 pushes flexible tube 320 to the right providing the +X displacement of the flexible tube 320 and fiber optic installed therein.

The −X displacement of flexible tube 320 can be achieved by supplying a negative voltage signal to actuators 210,220. As a result of the negative voltage signal, lower flexible fork frame 460 and upper frame 470 will move to the left. The simultaneous movement of sides 464 of lower fork frame member 460 and of side 472 of upper flexible fork frame 470 will push flexible tube 320 to the left providing the −X displacement.

Figure 9D:
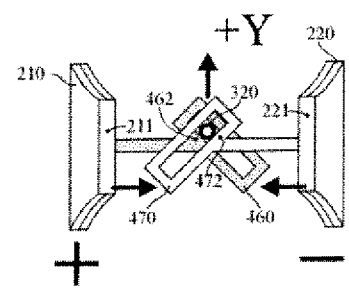

In FIG. 9D, the +Y displacement of flexible tube 320 is shown. When a positive voltage signal and negative voltage signal is supplied to actuators 210 and 220 respectively, upper portion 211 of actuator 210 moves to the right and pushes the lower flexible fork frame 460 to the right. Additionally, upper portion 221 of actuator 220 moves to the left and pushes the upper flexible fork frame 470 to the left. The simultaneous action of the side 462 coupled to lower flexible fork frame 460 and of side 472 coupled to upper flexible fork frame 470 induces the upward motion of flexible tube 320, thereby providing the +Y displacement of the flexible tube 320 and a fiber optic installed therein.

The −Y displacement of flexible tube 320 may be achieved by supplying a negative voltage to actuator 210 and positive voltage to actuator 220. Upper portion 211 of actuator 210 moves to the left and pulls the lower fork frame 460 to the left.

Upper portion 221 of the actuator 220 moves to the right and consequently pulls the upper flexible fork frame 470 to the right. The simultaneous action of the side 464 coupled to lower flexible fork frame 460 and of the side 474 coupled to upper flexible fork frame 470 pushes flexible tube 320 downward providing the −Y displacement of the flexible tube 320 and the fiber optic installed therein.

It is to be appreciated that other embodiments may be achieved, for instance three actuators may be attached to the side surfaces of the base separated by 120° angle and forming a flexible three-beam fiber optic positioned with a cross-shaped cross section. However, the alternate embodiments above cite examples are merely examples and as such, the present invention is not limited thereto.

Low frequency resonances of the cantilevered actuators attached to the base may be realized, and as such, these resonances must be suppressed. It has been determined found that the amplitude of the actuators tops deviation can sharply increase 20-50 times at the first resonance in comparison with the amplitude of the low-frequency deviations. For instance, at typical bimorph actuator having a length of about 15-20 mm, a first resonance at a frequency of about 1500 Hz was found. This means that the useful frequency bandwidth of the fiber optic positioner is restricted to about 500-1000 Hz. Further, sharp peaks in the frequency response must be suppressed to avoid the strong decrease of the sensitivity of the X and Y displacements in frequency intervals far from the resonant frequency.

In FIGS. 10A-10B, the fiber optic positioner according to another embodiment herein including a prism for suppressing passive damping of low-order resonances is shown. Referring to FIG. 10A, a rectangular prism 500 is shown attached to base 100, having a top surface 501, bottom surface 502, plurality of side surfaces 510, 520, and a gap 503. Base 100, includes a hole (not numbered) to receive a flexible tube 320. The bottom surface 501 of the prism 500 is attached to the top surface 101 of the base 100. It is to be appreciated that prism 500 and the base 100 can be fabricated from one piece of solid material. Examples of these materials can include but are not limited to: plexiglass, aluminum, and brass. The side surfaces 510 and 520 of the prism 500 are perpendicular to the top surface 501 and parallel to the internal surfaces of actuators 210 and 220. The gap 503 is disposed in a center of the prism 500 and is large enough to provide the free movement and motion of a flexible tube 320 during the X and Y displacements. The gaps between internal surfaces of the actuators 210 and 220 and respective side surfaces 510,520 of prism 500 may be pre-determined by end user specifications and are not limited to specific numbers or measurements. A visco-elastic material 610 and 620 is installed into these gaps and further into the hole of base 100 to among other things, to suppress vibrations of the flexible tube 320 as well as passive damping of low-order resonances. It has been determined the response amplitude at resonant frequencies can be reduced by 10-20 times whereas the response amplitude decreases only 3-4 times far from the resonance. That is, the Q-factor is significantly reduced from 20-50 to 2-3 strongly smoothing the resonance peak. Further, it has been determined that more uniform behavior of the frequency response of the fiber optic tip deviation and viewer suppression of the sensitivity from the resonance can be obtained if the gap between the internal surfaces of the actuators and side surfaces of the prism are not equidistant over the length of the actuators.

Figure 11:
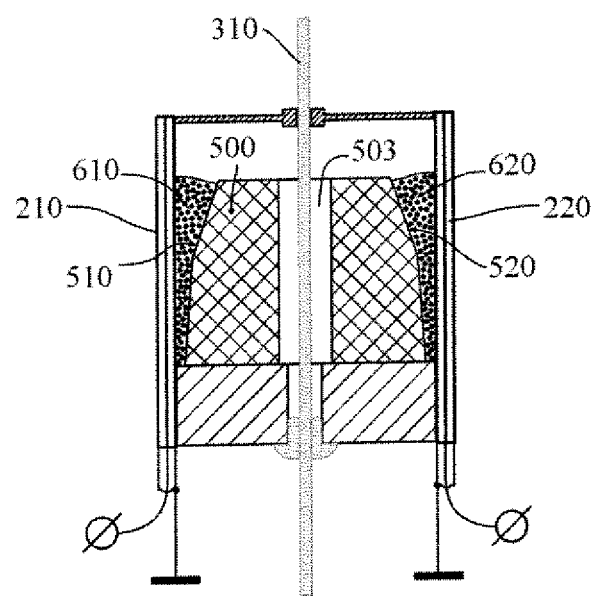
FIG. 11 illustrates a schematic diagram of a fiber optic positioner with passive damping according to another embodiment herein.

In FIG. 11, the fiber optic positioned according to another embodiment herein is shown having gaps between internal surfaces of the actuators 210 and 220 and side surfaces 510 and 520 of the base is shown. In this embodiment, it was determined that the smooth increase of the gap width from bottom to top of actuators 210,220 significantly improves the uniformity of the frequency response of the upper portion of the actuators 210, 220.

Figure 12:
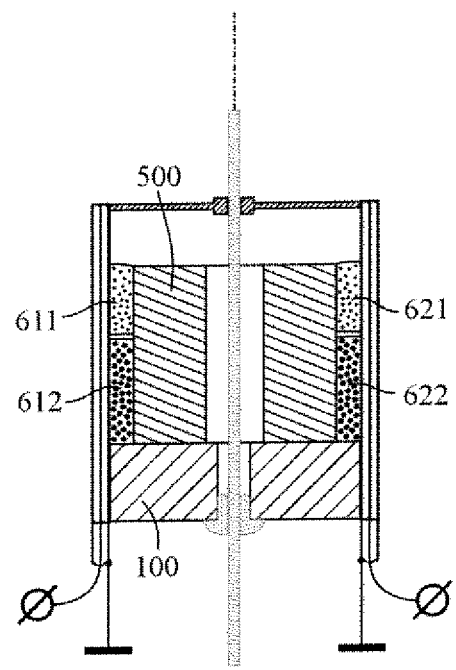
FIG. 12 illustrates a schematic diagram of a fiber optic positioned with passive damping according to another embodiment herein.

In FIG. 12, the fiber optic positioner with passive damping device according to another embodiment is shown. The gap between the actuators and prism has a uniform width, but the forming of the viscous-elastic material is different if it is applied from bottom to top of the actuators. Further it has been determined that in order to obtain a more uniform frequency response of actuators the bottom part of the gap should be filled with viscous damping material having higher hardness than the hardness of the damping material in the upper level of the gap.

Figure 13:
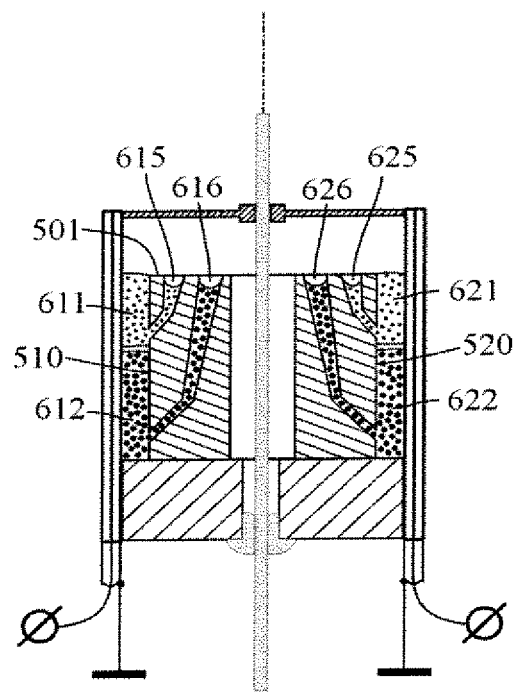
FIG. 13 illustrates a schematic diagram of the fiber optic positioner with passive damping according to another embodiment herein.

In FIG. 13, the design of the fiber optic positioned including a damping device according to another embodiment herein is shown where the damping material with different hardness is installed into the different areas of the gap thorough the channels in prism 500. Channels 616 and 626 connect the bottom areas of the gap with the upper surface 501 of the prism. Damping material 612 and 622 having larger hardness is installed through these channels from the bottom level of the gap. Channels 615 and 625 connect the upper areas of the gap with the upper surface 501 of the prism. The damping material 611 and 621 with smaller hardness is installed through these channels to the upper level of the gap. It is to be appreciated that number of levels can be one or more, and thus, the present invention is not limited thereto. Further, such examples of the harder damping material may include various UV cured compounds or two-component silicones or polyurethane materials, however, the present invention is not limited thereto. The filling of the gaps is accomplished when the UV cured compound or two-component viscous-elastic material has good enough fluidity to be installed throughout the channels 615, 616, 625, 626.

Figure 15:
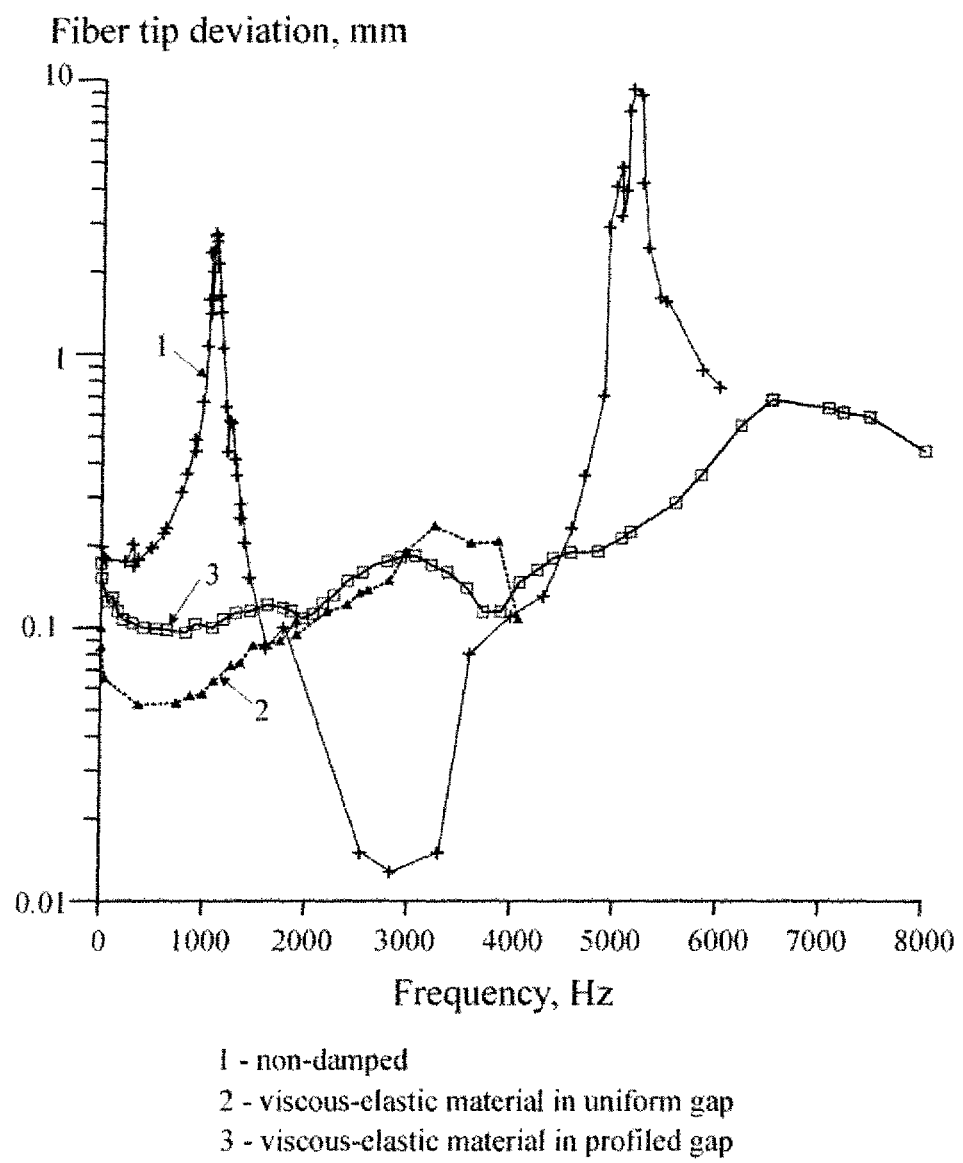
FIG. 15 illustrates a graphical representation of the deviation of the output end of the fiber optic for non-damped and damped fiber optic positioner according to an embodiment herein.

Referring to FIG. 15 a graphical representation of the typical dependence of the deviation interval of the fiber optic distal end is shown having a sine-wave voltage with amplitude +/−100V for non-damped and damped devices.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A device for the positioning of fiber optic output comprising:
   a base having a hole disposed at a midpoint thereof;
   a collar having an opening at a midpoint thereof;
   at least two bimorph actuators, each actuator connected to an outer side surface of said base and disposed at opposing ends thereof;
   at least two flexible beams, each of said flexible beam having a first end connected to said collar and a second end connected to at least one of said bimorph actuators;

a flexible tube inserted in said hole, wherein a bottom end of said tube is cantilevered at a bottom of said base and a top end of said tube is inserted in said opening of said collar; and a fiber optic embedded in said flexible tube.

2. The device of claim 1, further including:

a prism having first and second side surfaces and a bottom surface, said bottom surface contiguously contacting a top surface of said base and said first and second side surfaces located between each of said bimorph actuators to form gaps therebetween.

3. The device of claim 2, wherein a visco-elastic material is embedded in said gaps.

4. The device of claim 3, wherein a visco-elastic material is embedded in said hole of said base.

5. The device of claim 4, wherein each of said bimorph actuators comprise:

at least two electro-active sheets having flat surfaces;

conductive layers contiguously contacting each of said electro-active sheets; and a conducting mechanism to provide an electrical signal to said conductive layers, wherein a bottom end of each of said bimorph actuator are connected to each of said side surfaces of said base and an upper end of each of said bimorph actuators moves in a first direction when a first electrical voltage is supplied to said conducting mechanism.

6. The device of claim 5, wherein at least one of said flexible beams moves in the first direction when said first electrical voltage is supplied to said conducting mechanism of at least one of said bimorph actuators and at least one of said flexible beams simultaneously moves in a second direction.

7. The device of claim 6, wherein a top surface of said flexible tube extends in a longitudinal direction located flush with a top surface of each of said flexible beams, and is oriented perpendicular to said top surface of said base and moves in the first direction when said first electrical voltage is supplied to the conducting mechanism.

8. The device of claim 6, wherein a top surface of said flexible tube extends in a longitudinal direction, beyond a top surface of each of said flexible beams and is oriented perpendicular to said top surface of said base, and moves in the first direction when said first electrical voltage is supplied to said conducting mechanism.

9. The device of claim 7, wherein a second electrical voltage is supplied to the conducting mechanism of at least one of said bimorph actuators.

10. The device of claim 7, wherein each of said flexible beams and said collar comprise any one of a metal and composite material.

11. The device of claim 10 wherein, said electro-active sheets comprise any one of piezoelectric crystal, piezoelectric ceramic, and electro-strictive material.

12. The device of claim 11, wherein said flexible beams are coupled to said collar using any one of screws, welding techniques, soldering techniques, glues and two-component epoxy glues.

13. The device of claim 12, wherein the said opening of said collar is circular having an internal diameter greater than or equal to the external diameter of said flexible tube.

14. The device of claim 12, wherein said opening of said collar has a rectangular-shaped cross section, said opening further having a pre-determined width and pre-determined length, whereby said pre-determined width is equal to the external diameter said flexible tube, and said pre-determined length of said opening forms an angle with at least one of said flexible beams.

15. The device claim 13, wherein said flexible tube is bonded to said opening of said collar.

16. A fiber optic positioner comprising:

a base having a hole disposed at a midpoint thereof;

a collar having an opening at a midpoint thereof;

a plurality of bimorph actuators, each actuator connected to an outer side surface of said base and disposed at opposing ends thereof;

at least two flexible beams, each of said flexible beam having a first end connected to said collar and a second end connected to at least one of said bimorph actuators;

a flexible tube inserted in said hole, wherein a bottom end of said tube is cantilevered at a bottom of said base and a top end of said tube is inserted in said opening of said collar; and a fiber optic embedded in said flexible tube; and a prism having first and second side surfaces, a top surface, and a bottom surface, said bottom surface contiguously contacting a top surface of said base and said first and second side surfaces located between each of said bimorph actuators to form a gaps therebetween.

17. The fiber optic positioner of claim 16, wherein said gaps are filled with any one of a viscous, elastic and viscous-elastic damping material to provide the damping of vibrations of said bimorph actuators at resonances.

18. The fiber optic positioner of claim 16, wherein said gaps are filled with plurality of damping materials.

19. The fiber optic positioner of claim 18, wherein said prism further includes channels formed between said top of said prism and said first and second surfaces.

20. The fiber optic positioner of claim 18, wherein said plurality of said actuators is equal to two.

21. The fiber optic positioner of claim 18, wherein said plurality of said actuators is equal to three.

22. The fiber optic positioner of claim 18, wherein said plurality of said actuators is equal to four.

23. The fiber optic positioner of claim 18, wherein the electrical voltages applied to said conductive mechanism of said bimorph actuators have amplitudes and polarities providing a predetermined magnitude and direction of displacement of an end of a fiber optic output.

* * * * *